A. WALKER.
Seeder and Harrow.
No. 80,522. Patented July 28, 1868.
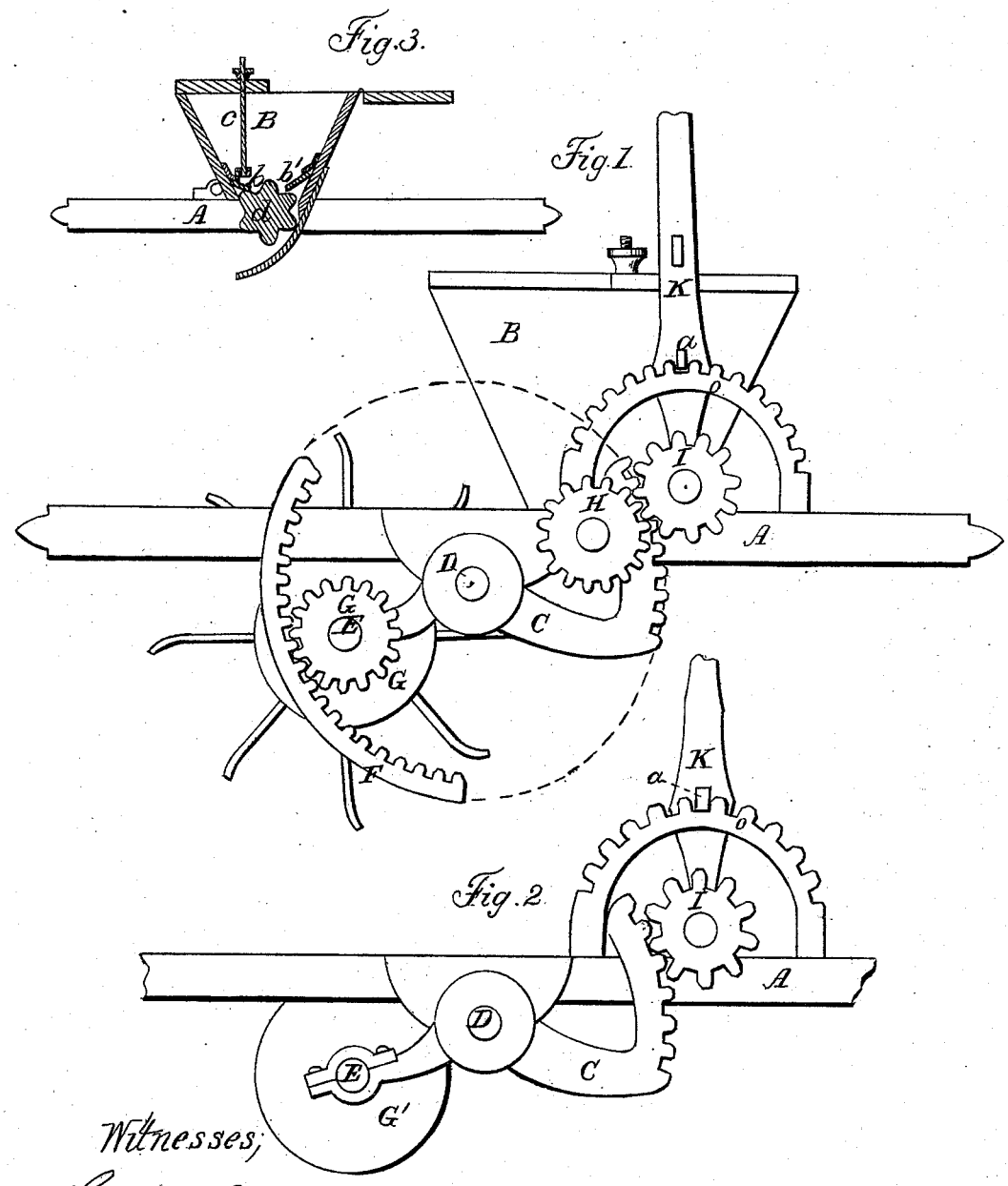

United States Patent Office.

ANDREW WALKER, OF CLAREMONT, NEW HAMPSHIRE.

*Letters Patent No. 80,522, dated July 28, 1868.*

---

IMPROVEMENT IN SEED-SOWER AND HARROW.

---

The Schedule referred to in these Letters Patent and making part of the same.

---

TO ALL WHOM IT MAY CONCERN:

Be it known that I, ANDREW WALKER, of Claremont, in the county of Sullivan, and State of New Hampshire, have invented certain Improvements in Seed-Sowers and Harrows; and I do hereby declare that the following is a full and exact description thereof, which will enable those skilled in the art to make and use the same, reference being had to the accompanying drawings, and letters of reference marked thereon, in which—

Figure I is a side view of my said seed-planter and harrow, showing the arrangement of its parts, the frame A, seed-box B, ratchet-lever C, pivoted to the main carrying-wheel axle at D, the harrow G', pivoted or attached to the rear end of lever at E, the sectional gears F of driving-wheel, shown by dotted circular line, gearing into the small gear-wheel G, to rotate the harrow G'. The sectional circular gears, shown by the section F, and the circular dotted line, are attached to the main wheel by certain well-known attachments not necessary to specify, as they are in common use. H is a small gear-wheel that rotates the fluted roller or seed-distributer, as shown in Fig. III by $d$, which is geared into the driving-wheel of which F is a section. I is a gear-wheel, worked by the lever K, and gears into the ratchet of the ratchet-lever C, stopped at any point of adjustment by the spring-stop $a$, thus allowing the harrow to be set to any depth.

Figure II shows the ratchet-lever C pivoted to the axle of the wheel D, the segmentary ratchet in front gearing into the gauge-ratchet wheel I, and showing the journal-box E at rear end, with the journal of the harrow passing through the box.

Figure III shows a section of the seed-box, showing the valves $b$ $b'$, the gauge-rod $c$, and the fluted roller $d$.

The improvements herein referred to consist of the combination of a seed-sower and harrow, the harrow being attached to a lever arranged so as to raise or lower it. I am well aware that rotary harrows have been in use. My improvement consists of a harrow attached to the rear end of a lever pivoted to the main axle of the carrying-wheels, and geared to the driving-wheels by small gear-wheels, which cause it to revolve, also the plan of raising and lowering the harrow by the use of a lever-attachment. By lowering the lever, the harrow will merely scratch the ground, useful in that position for covering small seeds or the mixing of plaster or other manures with the soil. By raising or pushing the lever forward, it sets in deeper. Harrows that are merely rotated by dragging them over the ground, make depressions in the surface to correspond to the teeth or arms. All the disturbance of the surface is in that case made by the arms prying themselves out of the ground, and not raising the surface enough to cover the seed. Harrows worked by gears tear up and agitate the surface, so as to completely cover the seed, and mix the manures sown. My improvement for distributing the seed is such that by raising or shortening the gauge-rod $c$, in Fig. III, I can control the distribution of the quantity of the seed.

The following is a description of the construction and operation of my said improvements:

Fig. I. B is a seed-box, attached to the frame A. C is a lever, pivoted to the main axle at D. At the rear end of lever C is the point of attachment for harrow, shown at E, the harrow rotated by the gear-wheel G geared into the circular wheel, of which a section is shown at F, the gauge-ratchet wheel gearing into a circular section of ratchet-lever C. D is the journal or axle of carrying-wheel. H is the gear-wheel, to rotate the fluted seed-roller, shown at $d$, Fig. III. $o$ is a geared circular ratchet, to catch or hold the stop $a$, attached to the lever K.

Fig. II shows the ratchet-lever C, carrying wheel-journal D, journal of harrow E, gauge-gear wheel I, circular ratchet $o$, lever K, with its adjustable stop $a$.

Fig. III shows the interior of the seed-box B, the valves $b$ $b'$, gauge-rod $c$. The seed is distributed by raising or shortening the rod $c$ by the nut at its top. The valve $b$ is raised enough by shortening the rod $c$ to allow a certain amount of seed to pass over or in the flutes of the roller $d$. The valve $b'$ is to prevent any seed passing through between the wall of the seed-box and the fluted roller $d$.

What I claim as my invention, and desire to secure by Letters Patent, is—

1. The ratchet-lever C, in combination with the harrow G', the gear-gauge wheel I, lever K, and circular ratchet $o$, with the spring-stop $a$ in lever K.

2. The valves $b$ $b'$, attached to the seed-box B, and gauge-rod $c$, in combination with the fluted roller $d$, the whole combined, arranged, and used as and for the purpose set forth.

ANDREW WALKER.

Witnesses:
S. P. CHESNEY,
M. S. HARVEY.